United States Patent [19]

Packo et al.

[11] Patent Number: 4,508,631

[45] Date of Patent: * Apr. 2, 1985

[54] DEHYDRATING REFRIGERANT

[75] Inventors: Joseph J. Packo, 30 Pelican Isle, Ft. Lauderdale, Fla.; Donald L. Bailey, Traverse City, Mich.

[73] Assignee: Joseph J. Packo, Ft. Lauderdale, Fla.

[ * ] Notice: The portion of the term of this patent subsequent to Apr. 5, 2000 has been disclaimed.

[21] Appl. No.: 519,623

[22] Filed: Aug. 2, 1983

[51] Int. Cl.$^3$ ................................................ C09K 5/00
[52] U.S. Cl. ............................................ 252/68; 62/85; 62/114; 252/67; 252/78.3; 252/194
[58] Field of Search ................ 62/85, 114; 252/67, 252/68, 78.3, 194

[56] References Cited

U.S. PATENT DOCUMENTS

| | | | |
|---|---|---|---|
| 3,912,651 | 10/1975 | Brown | 252/78.3 |
| 4,141,851 | 2/1979 | Askew et al. | 252/78.3 |
| 4,379,067 | 4/1983 | Packo et al. | 252/68 |
| 4,427,992 | 1/1984 | Ritchie et al. | 252/194 |

*Primary Examiner*—Paul Lieberman
*Assistant Examiner*—Robert A. Wax
*Attorney, Agent, or Firm*—Browdy and Neimark

[57] ABSTRACT

Refrigeration fluid compositions for refrigeration and air-conditioning circuits include a usual refrigerant fluid together with a liquid, hydrolyzable organosilane which exists as a liquid in the liquid phase of the air conditioning or refrigeration circuit, and which is capable of removing moisture from the interior of the circuit without forming a solid upon hydrolyzation.

14 Claims, No Drawings

DEHYDRATING REFRIGERANT

FIELD OF THE INVENTION

The present invention relates to improvements in air conditioning and refrigeration circuits and the like and, more particularly, to refrigerant compositions containing dehydrants and their use. It is related to copending application Ser. No. 397,191 filed July 12, 1982.

BACKGROUND OF INVENTION

In an article in the Federal Register, Vol. 45, No. 196, Oct. 7, 1980, entitled "Ozone-Depleting Chlorofluorocarbons; Proposed Production Restriction" by the Environmental Protection Agency, it is indicated that the amount of chlorofluorocarbons (CFC) emissions is of great concern to the environment, particularly with respect to its potential for ozone depletion. The problem is of such potential significance that even the banning of CFC has been considered.

CFSs are synthetic compounds which were developed in the 1930's. They are stable, non-flammable, and relatively non-toxic, which make them highly desirable from a worker and consumer safety standpoint. They are used in many applications because of their energy efficiency. Major CFC uses include use in air conditioning and refrigeration circuits, as well as for the freezing of foods.

Quite apart from future growth in the economy and in the refrigeration industry, CFCs currently have an immense economic impact on the U.S. economy, and the industry provides a substantial work force. Thus, on statistics presently available, about 500 million dollars worth of CFCs are used annually; more than 780 thousand jobs are directly related to CFC usage; approximately 260 thousand domestic businesses, mostly small businesses, use CFCs; the total value of goods and services that depend on CFCs exceed 28 billion dollars annually; the installed value of products that use CFCs is more than 135 billion dollars. In addition, CFCs are the basis of a major U.S. export market that would be jeopardized by restrictions on CFC usage because of emissions (leakage) of CFCs.

One of the major problems in existence relating to the use of CFCs is the leakage of the CFCs from refrigeration and air conditioning units. It can be easily seen that if restrictions were imposed because of such leakage, the impact on the economy would be enormous. However, even without a ban on the use of CFCs, a substantial economic loss is caused by the leakage and consequent replacement of CFCs in air conditioning and refrigeration systems. Moreover, there is a further economic loss because of additional demand of electrical energy caused by inefficient operation of cooling and refrigeration systems from which CFCs have leaked and have not been replaced. In this latter regard it has been estimated that if CFCs were banned, the adverse energy impact, caused by the inefficient operation of refrigeration and air conditioning units, would be equivalent to nearly 240 million barrels of oil by 1990, a figure which constitutes about 45% of current annual production from Alaska's North slope, or about 10% of the total United States crude oil imports in 1978.

In addition to the problems caused by refrigerant leakage as noted above, there are other known disadvantages including the inconvenience and cost of replacing refrigerant from a circuit from which it has already leaked. These problems exist not only relative to the use of CFCs as refrigerants, but also to all other refrigerant fluids. It is, accordingly, clear that it would be desirable to eliminate leakage of refrigerant fluids from air conditioning and refrigeration systems.

It should be understood that many difficulties in refrigerating and air conditioning circuits can be traced to the presence of moisture in the system. Moisture, usually considered acceptable in the art if present in quantities less than 5-25 parts per million, causes many problems as it circulates through the circuit in the presence of oil and the refrigerant, particularly at high temperatures which may be reached in the compressor and condensor. Thus, moisture may freeze at the refrigerant control orifice, causing clogging. Indeed, if moisture is present in large enough quantities, it will form ice in capillary tubes and expansion valves, plugging them. Water may also cause chemical breakdown of the oil, refrigerant and motor winding insulation and may create acids which ruin the motor winding and cause rusting or corrosion of the circuit walls, thereby causing pinholes and refrigerant leakage. It has been estimated that approximately 80% of all problems requiring air conditioning and refrigeration repairs are traceable to the presence of small quantities of moisture in the circuit.

To solve the difficulties caused by excess moisture, it is conventional to provide solid dehydrators or dryers in air conditioning and refrigeration circuits in the form of canisters, cartridges, filter units and the like. These devices, of course, increase the cost and complexity of the systems.

The 1940 U.S. Pat. No. 2,185,332 in the name of Crampton broadly discloses the addition of an acid neutralizing dehydrating agent, such as a metallic alcoholate, to an organic halogenated refrigerant fluid, such as dichloro, difluoro methane, in order to remove moisture from and neutralize any acid which may be either initially present in the refrigerant or subsequently formed during its use. However, there are many problems inherent in the use of alcoholates as suggested by Crampton.

Thus, the preferred alcoholate of Crampton is sodium methylate which is a white, free-flowing powder, sensitive to oxygen and which decomposes in air above 260° F. It is a hazardous material, flammable when exposed to heat or flame, and toxic and corrosive to tissue.

The next alcoholate in the series, sodium ethylate, is a white powder which readily hydrolyzes to alcohol and sodium hydroxide. It too is hazardous and forms sodium hydroxide when exposed to moisture. Another alcoholate mentioned, sodium phenolate, comprises white, deliquescent crystals which are decomposed by carbon dioxide in the air; this material also is hazardous, being a strong irritant to skin and tissue.

In addition to being hazardous materials, the alcoholates have other disadvantages. As pointed out by Crampton (page 2, line 60), sodium methylate reacts to form sodium chloride, which can precipitate in the system and cause blockage and corrosion. In addition, sodium methylate reacts with water to form sodium hydroxide, another corrosive material (page 3, line 5 of Crampton).

Moreover, regardless of the hazardous and corrosive nature of the products themselves and some of their products of reaction, the alcoholates themselves are solid and are usable according to the Crampton disclosure only because they are dissolved in solution. This presents an additional inherent disadvantage in that localized conditions may exist in the refrigeration circuit which cause the solid particles to come out of solution and deposit, possibly causing blockage and/or corrosion.

RELATED INVENTION

In copending application Ser. No. 397,191, a self-sealing refrigeration fluid is disclosed comprising a refrigerant and a quantity of non-volatile organosilane, the latter serving a secondary function as a dehydrant. The organosilane is suitably premixed with the pre-dried refrigerant and the composition is charged to a refrigeration or air conditioning circuit. These organosilanes react with water, such as at the situs of a leak, to produce a solid seal.

While the aforementioned system produces excellent and highly satisfactory results, the organosilanes used may react with water within the system to form a solid particulate composition which may require removal by filters which are conventionally present in the air conditioning and refrigeration circuits. Moreover, these materials are often quite costly, and there are some situations where, because of cost or other reasons, sealants are either not necessary or are not desirable. In addition, such organosilanes require careful usage, and must be added to air conditioning and refrigeration circuits by skilled personnel under dry conditions, and where other materials being added to the circuit have been pre-dried.

SUMMARY OF INVENTION

It has now been discovered that excellent results are achieved by the use of a liquid, organosilane which is incapable of performing a sealant function. These liquid organosilanes are compounds which react with water to produce a liquid silicone oil, rather than a solid. They are simpler to use than are sealants, as they may be merely added to the circuit and no pre-drying is necessary, i.e. they may be added by unskilled personnel such as in a service-station.

The present liquid organosilanes, which may be silicones, silanes, siloxanes, silazanes, in admixture with refrigeration fluids in air conditioning and refrigeration circuits, serve as the dehydrating agents to remove moisture from the circuits in question, such organosilanes being hydrolized by the water in the circuit thereby forming a silicone oil. They do not polymerize to form a solid, either in the nature of a seal or a particulate solid. In most cases, such organosilanes have a secondary advantage as well in that they neutralize or remove the acids which may be present in the circuit; in this latter regard, acids are formed by an oxidation of either a refrigerant or oil in the system, and such acids, particularly inorganic acids, are more corrosive in the presence of moisture than in a dry system. Regardless, the elimination of moisture and acid improves the efficiency of the refrigeration or air conditioning unit and also eliminates or markedly reduces the formation of holes in the circuit, through which some of the refrigerant fluid would otherwise tend to escape from the circuit.

In addition to preventing corrosion, use of the organosilane dehydrant reduces sludge formation which also tends to reduce blockage problems and also leads to better lubrication. Water removal also prevents the formation of ice crystals in the expansion valve or capillary tube which may restrict the flow of refrigerant or in severe cases stop it altogether. Traces of moisture also may cause rusting, corrosion, refrigerant decomposition, oil sludging or general deterioration of the system. There is general agreement among those skilled in refrigeration technology that the less water the better. Acids, particularly inorganic acids, are much more corrosive in the presence of moisture than in a dry system. Since hydrolyzable silanes and silicones are effective scavengers for moisture they do not only reduce the water content of refrigeration systems to negligible amounts but also remove any additional moisture introduced during their operation.

The present invention solves the aforementioned problems without the necessity of using mechanical dehydrators or dryers. This is accomplished through the reaction between water present in the system and liquid organosilane. The invention accordingly involves removing moisture and neutralizing acid thereby improving the performance and efficiency of the system. The liquid organosilane is introduced into the interior of the circuit either alone or in admixture, and the organosilane is inherently distributed by feeding the refrigerant to the system and running the system.

It is, accordingly, an object of the invention to overcome deficiencies in the prior art, such as those indicated above.

It is another object of the present invention to prevent or at least inhibit leakage of refrigerant fluids from refrigeration and air conditioning circuits by eliminating or reducing water in the circuits, one of the major causes of leakage.

It is still another object of the invention to reduce and inhibit the adverse effects of water and acids present in air conditioning and refrigeration circuits.

It is yet a further object of the invention to provide dehydrant refrigerant compositions embodying liquid organosilanes.

It is still a further object of the invention to provide dehydrant-refrigerant concentrates comprising relatively large quantities of the dehydrant.

DETAILED DESCRIPTION OF EMBODIMENTS

As noted above, the invention is usable in all systems having refrigeration or air conditioning circuits, including commercial, home and automobile air conditioning units; refrigeration and freezing circuits, including home freezers and refrigerators, commercial freezers and refrigerators; etc.

A "refrigerant" as used herein is any liquid substance which, by undergoing a change of phase to the vapor phase, lowers the temperature of its environment because of its latent heat. The instant invention can be utilized in conjunction with any refrigerant, the only restriction being that the refrigerant and the liquid organosilane dehydrant used in conjunction therewith must be inert and compatible with respect to one another. As refrigerants, there may be briefly mentioned the CFCs, including $CCl_3F$ (Refrigerant 11), $CCl_2F_2$ (Refrigerant 12), $CClF_3$ (Refrigerant 13) $C_2Cl_3F_3$, (Refrigerant 113), $C_2Cl_2F_4$ (Refrigerant 114), $CHClF_2$ (Refrigerant 22), Refrigerant 500 (azeotropic mixture of 73.8% $CCl_2F_2$ and 26.2%-$CH_3CHF_2$), Refrigerant 502 (azeotropic mixture of 48.8%-$CHClF_2$ and 51.2% $CClF_2CF_3$), Refrigerant 503 (mixture of 40% by weight $CHF_3$ and 60% $CClF_3$), Refrigerant 31/114 (mixture of 55% by weight $CH_2ClF$ and 45% by weight $C_2Cl_2F_4$), Refrigerant 12/31 (mixture of 78% by weight $CCl_2F_2$ and 22% by weight $CH_2ClF$), such refrigerants being commonly called "Freons"; ammonia; sulfur dioxide; ethyl or methyl chloride; methylene chloride; hydrocarbons such as propane or isobutane; dimethyl ether; and even binary mixtures such as methyl chloride together with dimethyl ether, and carbon dioxide together with nitrous oxide. With regard to the latter mentioned binary mixtures, they were proposed many years ago but were abandoned because one component of the mixture leaks more rapidly than another and when this occurs pressure readings become impossible to interpret; the instant invention solves this particular problem in that it eliminates a major cause of leakage. It will, on the other hand, be understood that the invention is of particular interest where the refrigerant fluid is a CFC or ammonia, as these are by far the most commonly used refrigerants.

In general, the organic silicon compounds useful in this invention are those which are end-blocked and therefore cannot polymerize or seal, yet which liquid compounds meet the functional requirements of the invention, primarily the dehydrant requirements. Such compounds contain hydrolyzable groups which serve the dehydrant function. In more detail, the silicon compounds must meet the following functional requirements:

(1) They must serve to dry the refrigeration or air conditioning system by chemically reacting with any moisture present. The term "chemically reacting" is used in the broad sense to include not only hydrolyzable groups which hydrolyze upon contact with water, but it is also intended to comprehend other forms of removing or taking up the water in the circuit, such as by complexing, adsorbing or absorbing, or in the broad sense chelating or sequestering.

(2) The products of the chemical reaction with moisture must be liquids compatible with the other components of the refrigeration system. This means that solids or polymeric gels which interfere with the operation of the system, may not be formed. Also, the products of the reactions should be soluble or at least compatible with the oil and refrigerant with the system.

(3) The silane dehydrant and the products of reaction with moisture should be unreactive with other components of the system under the operating conditions used.

(4) The silane dehydrant and the products of its chemical reaction with moisture may not be corrosive to the refrigeration system.

Having described the functional requirements, it will be understood that a wide variety of organo-silicon compounds may be used according to the invention. These include hydrolyzable organosilanes, low molecular weight silicone polymers containing hydrolyzable groups, polymeric silazanes and silathianes, and low molecular weight organic polymers containing hydrolyzable silane substituents.

Examples of suitable organo-silicon compounds which remain substantially in the liquid phase throughout the circuit and which function as non-sealant dehydrating agents according to the invention, are listed below.

It should be remembered that difunctional organosilanes do not form solids or gels, and therefore these difunctional compounds, as well as end-blocked compounds which also will not form solids upon reaction with water, are particularly easy to use according to the invention. Trifunctional organosilanes, on the contrary, including some listed below, must be used more carefully, particularly the low molecular weight trifunctional silanes; these must always be used in excess in relation to the amount of water contemplated in the air conditioning or refrigeration circuit. Even though such compounds will, upon reaction with water, form solid polymeric gels, they will not form such gels in the presence of large amounts of refrigerant which act as solvent, particularly when used in a substantial excess in relation to the amount of water in the circuit. In addition, the longer chain trifunctional silanes do not gel as easily as the lower molecular weight compounds.

In general, it is preferred that the average number of hydrolyzable substituents in the organosilane liquid be less than two. Thus, even where a difunctional organosilane such as dimethyldiethoxysilane is used, it is desirable to include a small quantity of monofunctional organosilane, such as trimethyl ethoxysilane, the latter of which acts as an end-blocker and reduces the average number of silicon-bonded hydrolyzable substituents to less than two. Of course, where a trifunctional silane is used, then the presence of an end-blocker is even more desirable.

By the statement above that the low molecular weight trifunctional organosilanes should be used in excess in relation to the water in the circuit, what is meant is that the total quantity of organosilane should be in excess to the amount of water in the circuit. This means that if a blend of organosilanes is used, only one of which is a low molecular weight trifunctional organosilane the total quantity of the blend should exceed the quantity of water in the circuit to be dried, but the actual quantity of the low molecular weight trifunctional organosilane component may be less than the quantity of water to be removed from the system.

Suitable organosilanes, some of which should be used in excess with regard to the quantity of water to the circuit to be dried, are:

A. Alkoxysilanes of the formula, $R_3SiOR$, wherein R is a hydrocarbon substituent, preferably alkyl, alkylene, vinyl, phenyl or phenylalkyl, of 1–5 carbon atoms, —OR, a polyoxyalkylene substituent of the formula —$C_3H_6(C_2H_4)x(C_3H_6)y$ OR where x and y are integers from 1–10, or an organofunctional substituent of the type cyanoalkyl, aminoalkyl, trifluoropropyl, chlorophenyl, mercaptylalkyl, carbethoxyalkyl, and the like.

Examples of such suitable alkoxysilanes are:
1. Ethyltriethoxysilane
2. Methyltrimethoxysilane
3. Amyltriethoxysilane
4. Phenylethyltriethoxysilane
5. Dimethyldimethoxysilane
6. Ethylmethyldiethoxysilane
7. Cyanoethyltriethyoxysilane
8. Trifluoropropyltriethoxysilane
9. $CH_3O(C_2H_4)xOC_3H_6Si(OCH_3)_3$
10. Phenylmethyldiethoxysilane
11. Phenylmethyldimethoxysilane
12. Phenylethyldimethoxysilane
13. Phenylethyliethoxysilane
14. Trimethylethoxysilane and
15. Mixtures of the above.

The ninth listed alkoxysilane above and similar silicon-substituted polyoxyalkylene polymers are important because not only are they dehydrants, but also because they act as good lubricants for the refrigeration system.

Amyltriethoxysilane, ethylethoxysilane and hydrocarbon-substituted trifunctional alkoxysilanes are all right to use as dehydrants because they will not form solid polymeric gels in the presence of large amounts of refrigerant.

B. Aminosilanes of the formula, $R_3Si-NR'R'$, wherein: R is a hydrocarbon substituent, preferably alkyl, alkylene, vinyl, phenyl, phenylalkyl, of 1–15 carbon atoms, —NR'R', a polyoxyalkylene chain or an organofunctional substituent; and R' is a hydrocarbon substituent from 1–10 carbon atoms, hydrogen or an —Si $R_3$ substituent.

Examples of such aminosilanes are:
1. Dimethylbis-(dimethylamino)silane
2. Trimethyldimethylaminosilane
3. Hexamethyldisilazane C. Mercaptosilanes of the formula, $R_3Si-SR$, wherein: R is a hydrocarbon substituent, preferably alkyl, alkylene, vinyl, phenyl, phenylalkyl, —SR, etc.

Based on cost and availability, the mercaptosilanes are less preferred as dehydrants. There may be briefly mentioned, however, phenylmethyldimercaptosilane.

D. Acyloxysilanes can be defined similarly to the above. They are less preferred as dehydrants due to cost and availability.

E. Polymers and partial hydrolyzates:

The monomers described above can be converted into low molecular weight polymers by partial hydrolysis of these monomers with limited amounts of water. For example, the compound, dimethylbis-(dimethylamino)silane is converted into a low molecular weight polymer having the average composition, $(CH_3)_2N$-$(CH_3)_2SiO(CH_3)_2Si$-N $(CH_3)_2$, by reaction with one-half mole of water. Such polymers are good dehydrants for refrigeration systems. Partial cohydrolyzates of two or more monomers can also be used. In summary, liquid silicone polymers having hydrolyzable groups (preferably amino or alkoxy) will be effective dehydrants but have a lower capacity to remove water because there is a lower amount of hydrolyzable groups present.

A large number of low molecular weight silicone polymers containing hydrolyzable groups can also be used. Polymeric silazanes and silathianes, although not preferred, could also be used. Finally, low molecular weight polymers containing hydrolyzable silane substituents can also be used.

The liquid organosilane, in the liquid portion of the circuit, is dissolved in the refrigerant with which it is miscible. In the gaseous portions of the circuit, the organosilane may exist as a thin liquid film on the interior of the pipe, either alone or in admixture with lubricating oil, or it may become atomized. In any event, the organosilane is a liquid which reacts with water in the air conditioning or refrigeration circuit and becomes hydrolyzed to a liquid.

In general, the liquid organosilane used in accordance with the instant invention may be described as a silicon-substituted monomeric and polymeric liquid or mixture thereof containing one, two or three, preferably one or two, silicon-bonding hydrolyzable substituents selected from the group consisting of alkylamino, dialkylamino-, mercapto-, acyloxy-, alkyloxy-groups and the like.

In general, use of these organosilane or silicone liquids in the air conditioning and refrigeration circuit accomplishes the following results: acids in the system are neutralized; the pH of the fluid becomes stabilized; corrosion, rust and oxidation are inhibited by removal of internal water; the life of the equipment is prolonged; loss of refrigerant is stopped; cooling efficiency is improved; lubrication is improved; and energy is saved.

The amount of silane or silicone liquid used in the present invention is not critical provided the amount present is more than sufficient to react with residual moisture in the system, particularly if a trifunctional organosilane is used. If the refrigeration system is relatively dry, small amounts of the liquid organosilane can be effective. Generally, it is advisable to use a 200–1000 percent molar excess of additive based on the moisture likely to be present in the system. This prevents the possibility of gels or polymers forming in the internal parts of the refrigeration circuit, if using a trifunctional silane, which could adversely affect operation of the equipment.

The compositions of the present invention may be provided in a wide range of concentrations, depending on whether the composition is to be used "as is", as a dehydrant/refrigerant or as a concentrate either for addition to an already existing circuit for "make up" purposes or for addition to a new or empty circuit in combination with conventional refrigerant. Thus, compositions in accordance with the invention may comprise from 100 ppm (parts per million), i.e. 0.01% of organosilane to 100% organosilane, the remainder if any being refrigerant fluid and/or lubricant liquid. For compositions to be used at or near full strength, the concentration may range from 100 ppm to 10% organosilane, preferably 0.5% to 1% organosilane, with the remainder being refrigerant plus optionally lubricant liquid, e.g. oil. Concentrates may have a wide range of concentration, normally ranging from 5–99% of the organosilane liquid or even more.

If desired, small amounts of other additives may also be included, so long as the other additives do not interfere with the capacity of the fluid to act as a refrigerant and do not adversely affect the capacity of the organosilane to carry out its function as a dehydrant. For example, the composition may include, as such an additive, an odoriferous material which serves as a leak detecting agent or odorant, such as peppermint, or a foul smelling compound such as a mercaptan. As noted above, lubricating oil may also be present. Sealants, such as those of copending application Ser. No. 397,191 or U.S. Pat. No. 4,379,067, may also be admixed with the present organosilane dehydrants. However, it is preferred that the dehydrant be used first, followed by operating the air-conditioning circuit for about 10 minutes, and then that the sealant composition be added.

Accordingly, the essential ingredients of the composition are the refrigerant itself and the silicone or organosilane liquid or mixture thereof, it being necessary that the organosilane be inert and compatible with respect to the refrigerant and the equipment used. It will be understood that, in view of its usage, the organosilane liquid should be environmentally acceptable, non-corrosive and sufficiently stable so that storage presents little difficulty.

In addition to the composition as described above, the invention also involves the method of dehydrating closed refrigeration and air conditioning circuits in order to obviate the problems mentioned above. This method involves introducing into the interior of the circuit the liquid organosilane either alone or in admixture with either or both of a compatible refrigerant and a compatible lubricating oil. If introduced alone or with lubricating oil, such step may be either preceded or followed by introduction of refrigerant, which in turn serves to distribute the dehydrant throughout the circuit. The method of introducing the hydrolyzable silane or silicone additive into the refrigeration system is not critical. As noted above, it can be mixed with the refrigerant, with the lubricating oil or directly injected into the system. Generally the most convenient method is to recharge the system with refrigerant fluid containing the additive in accordance with known procedures used for charging other refrigerating fluids.

When charging the hydrolyzable silanes or silicones to the system, it is preferable but not essential that the system be pre-dried and freed of moisture as much as possible consistent with usual practice. However, one of the advantages of the present invention is that such conventional pre-drying need not be used. Where the refrigeration system has been open to atmospheric moisture and the canister of drier has become wet, replacement of the drier canister is suggested. In charging these organosilane compositions to air conditioning or refrigeration units containing chlorofluorocarbons as refrigerants, such refrigerants should be slowly added in the liquid state, to ensure adequate lubrication of the compressor; otherwise, the solvent action of the refrigerant can remove oil needed for lubrication of the compressor. The selection of a particular refrigerant and sealant will depend on the type of equipment and the service requirements. The type of refrigerant will be known to those skilled in the refrigerating and air conditioning arts.

It should be understood that in general the liquid organosilane or mixture must have the following characteristics: It must be compatible with the selected refrigerant fluid and the materials from which the circuits are formed, in the sense that it must not interact to change the character of the refrigerant fluid or the circuit material; it must not interfere to a substantial degree, in the quantity present, with the properties of the refrigerant which make it suitable as a refrigerating fluid; it must exist as a liquid in the liquid portion of the circuit without forming a solid upon hydrolyzation and must be capable of carrying out its dehydrating function by hydrolyzing in contact with moisture to form a liquid silinol or silicone oil which is compatible with the refrigerant; it should not be a dangerous pyrophoric material; it should be non-corrosive and sufficiently stable so that storage presents little difficulty; and desirably it should be environmentally acceptable.

The following examples further illustrate without limiting the nature of the invention:

EXAMPLE 1

A mixture is formed consisting of 95% of refrigerant 12 and 5% of a mixture of 19 parts by weight of dimethyldiethoxysilane and 1 part of trimethylethoxysilane. The mixture is charged, under pressure, into a conventional can to be used for charging automobile air-conditioning units. The mixture is then discharged from the can into an automobile air-conditioning unit.

EXAMPLE 2

Similar to Example 1, a refrigerant composition is prepared for large industrial and commercial systems, including 99.5% refrigerant 11 and 0.5% of a liquid organosilane formed 2 parts of bis(dimethylamino)-dimethylsilane, 1 part of dimethyldiethoxysilane and 1 part of dimethyldimethoxysilane.

EXAMPLE 3

Similar to Example 1, a refrigerant fluid mixture is prepared of 99.8% refrigerant 22 together with 0.2% of the organosilane mixture of Example 1.

EXAMPLE 4

A concentrate is prepared for commercial freezers and display cases comprising 50% refrigerant 502 and 50% organosilane. As the organosilane there is used the mixture of Example 1. Another concentrate of the same proportions is made, using the organosilane mixture of Example 2.

EXAMPLE 5

A mixture is formed of 99% refrigerant and 1% of the organosilane mixture of example 2 to which is added 5% (based on the total weight of organosilane and additive) of acetyl acetonate, such additive being used as a lubricant aid.

The foregoing description of specific embodiments will so fully reveal the general nature of the invention that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A moisture removing refrigeration fluid composition for refrigeration and air-conditioning units, comprising:
   (a) a material selected from the group consisting of a refrigerant fluid, a lubricating fluid and a mixture thereof; and
   (b) a liquid organosilane hydrolyzable dehydrant for removing moisture from the interior of the refrigeration or air-conditioning circuit, said liquid hydrolyzable organosilane or mixture thereof being reactable with moisture to form a liquid, being compatible with said refrigerant fluid both before and after hydrolysis, said organosilane further being one which does not substantially interfere with the properties of the refrigerant fluid, which exists as a liquid in the liquid portion of the circuit, and which is substantially inert to the material from which the circuit is made.

2. A composition according to claim 1, wherein, said refrigerant fluid is a chlorofluorocarbon.

3. A composition according to claim 1, wherein said refrigerant fluid is ammonia.

4. A composition according to claim 1 intended for use at full strength wherein said organosilane liquid comprises 100 ppm to 10% of said composition, the remainder being essentially said refrigerant fluid.

5. A composition according to claim 1, wherein component (a) constitutes a mixture of refrigerant fluid and lubricating fluid.

6. A composition according to claim 1, wherein said organosilane liquid comprises a difunctional organosilane or an end-blocked organosilane.

7. A composition for removing moisture from refrigeration or air-conditioning systems, which comprises a hydrolyzable organosilane monomer, hydrolyzable silicone polymer or mixture thereof, said organosilane or polymer being one which, upon reaction with moisture, does not form an incompatible solid or polymeric gel which interferes with operation of the system, said composition being contained under pressure within a container, said pressure being supplied by a pressurized gas capable of functioning as a refrigerant fluid.

8. A method of removing moisture from refrigeration or air-conditioning systems, which comprises introducing a hydrolyzable organosilane monomer, hydrolyzable silicone polymer or mixture thereof into the system, with the proviso that upon reaction with moisture, said organosilane monomer or silicone polymer does not form an incompatible solid or polymeric gel which interfers with the operation of the system.

9. A method according to claim 8, wherein said hydrolyzable organosilane monomer or hydrolyzable silicone polymer is introduced to the system in conjunction with a refrigerant fluid.

10. A method according to claim 9, wherein the liquid organosilane monomer or polymer and said refrigerant fluid are charged to the interior of the circuit sequentially, with the charging of the refrigerant fluid following the charging of the liquid organosilane.

11. A method according to claim 9, wherein said refrigerant fluid and said liquid organosilane are admixed prior to charging to said circuit.

12. A method according to claim 9, wherein the quantity of said liquid organosilane monomer or polymer is substantially in excess of the quantity of moisture in the system.

13. A composition according to claim 7, wherein said container constitutes an air conditioning or refrigeration circuit, said pressurized gas comprising a refrigerant fluid.

14. A composition according to claim 7, wherein said container is a can for use in charging air conditioning or refrigeration circuits.

* * * * *